(12) United States Patent
Kim

(10) Patent No.: US 11,035,497 B2
(45) Date of Patent: Jun. 15, 2021

(54) CENTRIFUGAL VALVE CONTROL APPARATUS

(71) Applicant: DAEGU GYEONGBUK INSTITUTE OF SCIENCE AND TECHNOLOGY, Daegu (KR)

(72) Inventor: Min Seok Kim, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 153 days.

(21) Appl. No.: 16/516,769

(22) Filed: Jul. 19, 2019

(65) Prior Publication Data
US 2020/0025312 A1 Jan. 23, 2020

(30) Foreign Application Priority Data

Jul. 20, 2018 (KR) .................. 10-2018-0084839

(51) Int. Cl.
*F16K 99/00* (2006.01)
*B01L 7/00* (2006.01)
*B01L 3/00* (2006.01)

(52) U.S. Cl.
CPC .... *F16K 99/0046* (2013.01); *B01L 3/502746* (2013.01); *B01L 7/00* (2013.01);
(Continued)

(58) Field of Classification Search
CPC ......... F16K 99/0046; F16K 2099/0084; F16K 99/0032; F16K 99/0044; F16K 99/0063; B01L 3/502746; B01L 7/00; B01L 2300/087; B01L 2300/0874; B01L 2300/1827; B01L 2400/0409;
(Continued)

(56) References Cited

U.S. PATENT DOCUMENTS 6,030,581 A * 2/2000 Virtanen ............... B01L 3/5027
422/68.1
6,063,589 A * 5/2000 Kellogg .............. B01F 13/0059
366/DIG. 3
(Continued)

FOREIGN PATENT DOCUMENTS

KR      100763922      10/2007
KR     20140055528      5/2014
WO      2006035800      4/2006

OTHER PUBLICATIONS

Korean Office Action—Korean Application No. 10-2018-0084839 dated Oct. 22, 2019.

*Primary Examiner* — Kenneth Rinehart
*Assistant Examiner* — Jonathan J Waddy
(74) *Attorney, Agent, or Firm* — Lex IP Meister, PLLC

(57) ABSTRACT

Provided is a centrifugal valve control apparatus including: a body part including a body having a chamber and a channel connected to the chamber, and a valve configured to open and close the channel; a heating part coupled to the body and including a heating member disposed at a position corresponding to the valve; and a rotation driving part configured to rotate the body part and the heating part together, wherein the valve is formed to open and close the channel by the heating member while the body part and the heating part rotate together. Accordingly, the valve of the centrifugal valve control apparatus may be accurately controlled.

21 Claims, 8 Drawing Sheets

(52) U.S. Cl.
CPC ..... *B01L 2200/10* (2013.01); *B01L 2300/087* (2013.01); *B01L 2300/0874* (2013.01); *B01L 2300/1827* (2013.01); *B01L 2400/0409* (2013.01); *B01L 2400/0677* (2013.01); *F16K 99/0032* (2013.01); *F16K 2099/0084* (2013.01)

(58) Field of Classification Search
CPC ....... B01L 3/502738; B01L 2400/0677; B01L 2200/10; B01F 15/0201; B01F 15/0233; G01N 21/07; G01N 33/54366; G01N 35/00069; G01N 2035/00504
See application file for complete search history.

(56) References Cited

U.S. PATENT DOCUMENTS

| | | | |
|---|---|---|---|
| 6,632,399 B1* | 10/2003 | Kellogg | B01F 13/0059 422/505 |
| 6,706,519 B1* | 3/2004 | Kellogg | B01F 13/0064 422/64 |
| 8,658,113 B2* | 2/2014 | Yoo | B01L 7/00 422/537 |
| 8,679,831 B2* | 3/2014 | Handique | B01L 3/502707 435/325 |
| 9,096,823 B1* | 8/2015 | Branch | B01L 3/5027 |
| 2015/0138567 A1* | 5/2015 | Huang | G01N 21/07 356/614 |

\* cited by examiner

CENTRIFUGAL VALVE CONTROL APPARATUS

BACKGROUND

1. Field of the Invention

The present disclosure relates to a centrifugal valve control apparatus, and more particularly, to a centrifugal valve control apparatus capable of accurately controlling a valve.

2. Discussion of Related Art

Generally, an apparatus used to perform a biological or chemical reaction by manipulating a small amount of fluid is referred to as a centrifugal valve control apparatus.

Such a centrifugal valve control apparatus includes microfluidic structures disposed in a platform of various shapes such as a chip, a disk, and the like.

Here, the microfluidic structures include a chamber capable of accommodating fluids, a channel through which the fluids can flow, and a valve capable of adjusting a flow of the fluids, and the chamber, the channel, and the valve can be disposed in various combinations in the platform.

A chip, in which the microfluidic structure is disposed on a chip-shaped platform so that tests including a biochemical reaction are performed on a small chip is referred to as a bio chip, and particularly, a device manufactured to perform multiple steps of processing and manipulation on one chip is referred to as a lab-on-a chip.

A driving pressure is necessary to transfer the fluids in the microfluidic structure, and either a capillary pressure or a pressure by a separate pump is used as the driving pressure.

Recently, centrifugal valve control apparatuses on the basis of a centrifugal force have been proposed in which a microfluidic structure is disposed on a disk-shaped platform and a series of operations are performed while moving fluids using the centrifugal force. The above is also called a Lab CD or a Lab-on a CD.

A method of opening and closing a channel using a magnetic force, a method of opening and closing a channel using a phase transition material, and the like are used for a valve provided in the centrifugal valve control apparatus.

Here, in the case in which the method of opening and closing a channel using a phase transition material is used, in order to operate a normal close valve, a cured phase transition material is formed in the middle of the channel, and when the phase transition material in the channel is heated, the phase transition material is melted to open the channel.

However, in a conventional centrifugal valve control apparatus on the basis of a centrifugal force configured to move fluids using the centrifugal force, since energy is difficult to be correctly transferred to a phase transition material and thus the phase transition material is not completely melted, a channel can be incompletely opened. Accordingly, a technology for correctly controlling a position of a heating member to heat the phase transition material is necessary.

FIG. 1 is a perspective view illustrating a conventional centrifugal valve control apparatus.

As shown in FIG. 1, a conventional centrifugal valve control apparatus 10 includes a plurality of chambers 50 configured to accommodate a fluid therein, channels 60 connected to the chambers 50 and configured to provide paths of the fluids, and valves 70 configured to control the flow of the fluids by opening and closing the channels 60.

The centrifugal valve control apparatus 10 can be mounted on a motor (not shown) to rotate at high speed, and a mounting through hole 21 is formed in a center portion of the centrifugal valve control apparatus 10 to be mountable on the motor.

The fluids accommodated in the chambers 50 or the channels 60 of the centrifugal valve control apparatus 10 is pressurized in a direction toward an outer circumferential portion of a platform 20 by a centrifugal force generated by rotation of the motor.

The valve 70 ordinarily closes the channel 60, and when electromagnetic wave energy is emitted to a valve material accommodated in the channel 60, the valve material is melted and thus the channel 60 is opened.

A laser light source 11 is an example of an energy source for irradiating electromagnetic waves to the valve material, and supplies energy to the valve material by irradiating a laser L which is a sort of an electromagnetic wave to the valve material.

Since the above-described conventional centrifugal valve control apparatus 10 opens the valve by irradiating the laser L to the valve material through the laser light source 11 provided separately from the centrifugal valve control apparatus 10 while the centrifugal valve control apparatus 10 rotates, there is a problem that the laser light source 11 is difficult to correctly irradiate the laser L to a position of the valve 70 and thus accuracy of controlling the valve 70 is low.

PRIOR ART DOCUMENT

Patent Document

Korean Patent Laid-Open No. 10-0763922

SUMMARY OF THE INVENTION

The present disclosure is directed to a centrifugal valve control apparatus which includes a heating member at a position corresponding to a valve and fixes the position thereof during rotation of the centrifugal valve control apparatus, to allow the heating member to melt a valve material at a correct position so that the valve can be accurately controlled.

Further, the present disclosure is directed to a centrifugal valve control apparatus configured to control a switch and a heating member in consideration of the type of a valve material and a rotational speed thereof, to allow the heating member to completely melt the valve material so that the valve can be accurately controlled.

In addition, the present disclosure is directed to a centrifugal valve control apparatus capable of maintaining the balance of a centrifugal force which acts on an entire surface of a body part while the centrifugal valve control apparatus rotates, and preventing a noise caused by bias of the centrifugal force and damage thereto by symmetrically arranging a battery and other components which may be disposed on a heating part.

In addition, the present disclosure is directed to a centrifugal valve control apparatus capable of effectively transferring heat generated by a heating member to a valve under the heating member and easily melting a valve material by arranging a heat transfer member between the valve and the heating member.

Technical problems desired to be solved by the present disclosure is not limited to the above-described problems, and other technical problems which are not mentioned may be apparently understood by those skilled in the art from the specification and the accompanying drawings.

According to an aspect of the present disclosure, there is provided a centrifugal valve control apparatus including: a body part including a body having a chamber and a channel connected to the chamber, and a valve configured to open and close the channel; a heating part coupled to the body and including a heating member disposed at a position corresponding to the valve; and a rotation driving part configured to rotate the body part and the heating part together, wherein the valve is formed to open and close the channel by the heating member while the body part and the heating part rotate together.

Here, the body may be formed of a tube having a predetermined height, and the heating part may be formed of a substrate.

Further, each of the chamber and the channel is provided in the body.

The valve may be provided in the body, and the heating member may be provided a lower part of the heating part.

The centrifugal valve control apparatus may further include a battery configured to supply power to the heating member.

The channel and the valve formed in the channel may be provided in plural in the body, and the heating members corresponding to the valves may be provided in the heating part.

The battery may be formed to supply the power to one or more heating members provided in the heating part.

The battery may be disposed at a center of the heating part.

In addition, a plurality of batteries may be provided on the heating part and symmetrically disposed.

The rotation driving part may include a rotating shaft coupled to a rotation center of each of the body and the heating part, a driving motor configured to rotate the rotating shaft, and a controller configured to control driving of the driving motor.

The heating member may be formed of a heating element, and the heating element may be provided in a hole formed in a lower part of the heating part.

The centrifugal valve control apparatus may further include a heat transfer member provided between the valve and the heating member.

The heat transfer member may be formed of a material in which at least one of diamond, silver, aluminum oxide, boron nitride, zinc oxide, and aluminum nitride is included in a matrix including at least one of epoxy, silicon, urethane, and acrylate.

The valve may be formed of a phase transition material melted by heating of the heating member.

The heating element may be formed of a resistor, and may further include a controlling part configured to control a current or voltage applied to the resistor.

The controlling part may control the current or voltage applied to the resistor according to the type of a material forming the valve or a rotational speed of each of the body part and the heating part.

The centrifugal valve control apparatus may further include a switch configured to turn on or off electrical connection between the heating member and the battery.

The centrifugal valve control apparatus may further include a fixing unit configured to fix the heating part to the body part.

The fixing unit may include a fixing member provided on at least one of an outer side or a center of each of the body part and the heating part.

The fixing unit may include a groove formed in the body part and a protrusion formed on the heating part to be fittable into the groove.

The centrifugal valve control apparatus may further include a communication part provided on the heating part and configured to communicate with the outside to apply a control signal to the controlling part.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
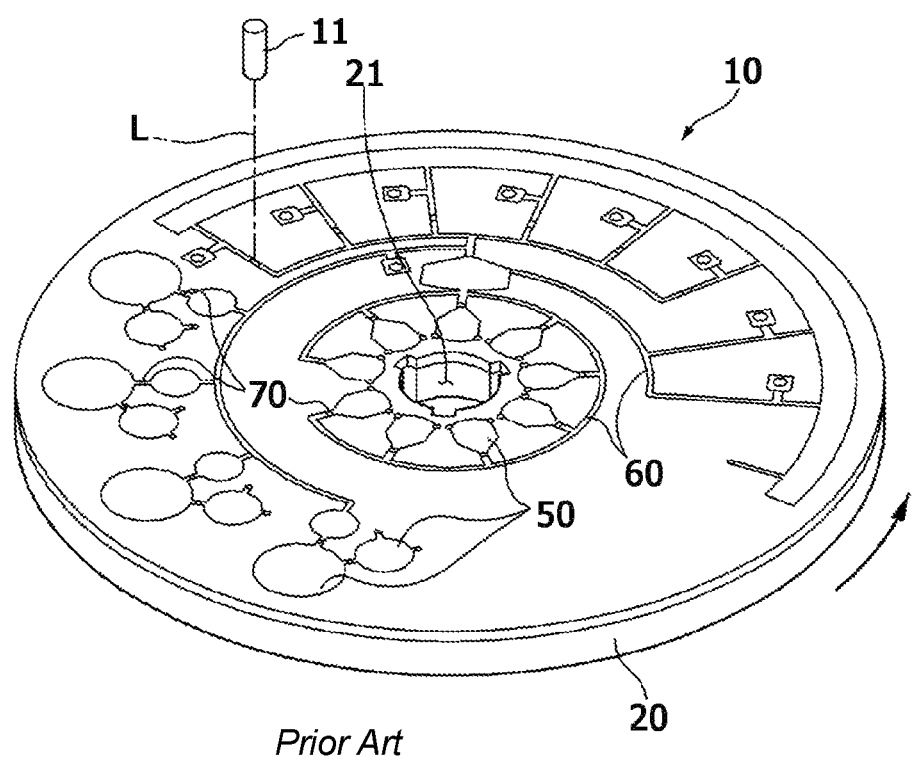
FIG. 1 is a perspective view illustrating a conventional centrifugal valve control apparatus.

Preferable embodiments according to the present disclosure will be described in detail with reference to the accompanying drawings, and the same reference numerals are provided to the same or similar elements, and overlapping descriptions of the above will be omitted.

Further, while describing the present disclosure, when a specific description for a related known technology is determined to obscure the gist of the present disclosure, the detailed description will be omitted. In addition, the accompanying drawings are only provided so that the spirit of the present disclosure may be easily understood, and should not be understood that the spirit of the present disclosure is limited by the accompanying drawings.

Figure 2:
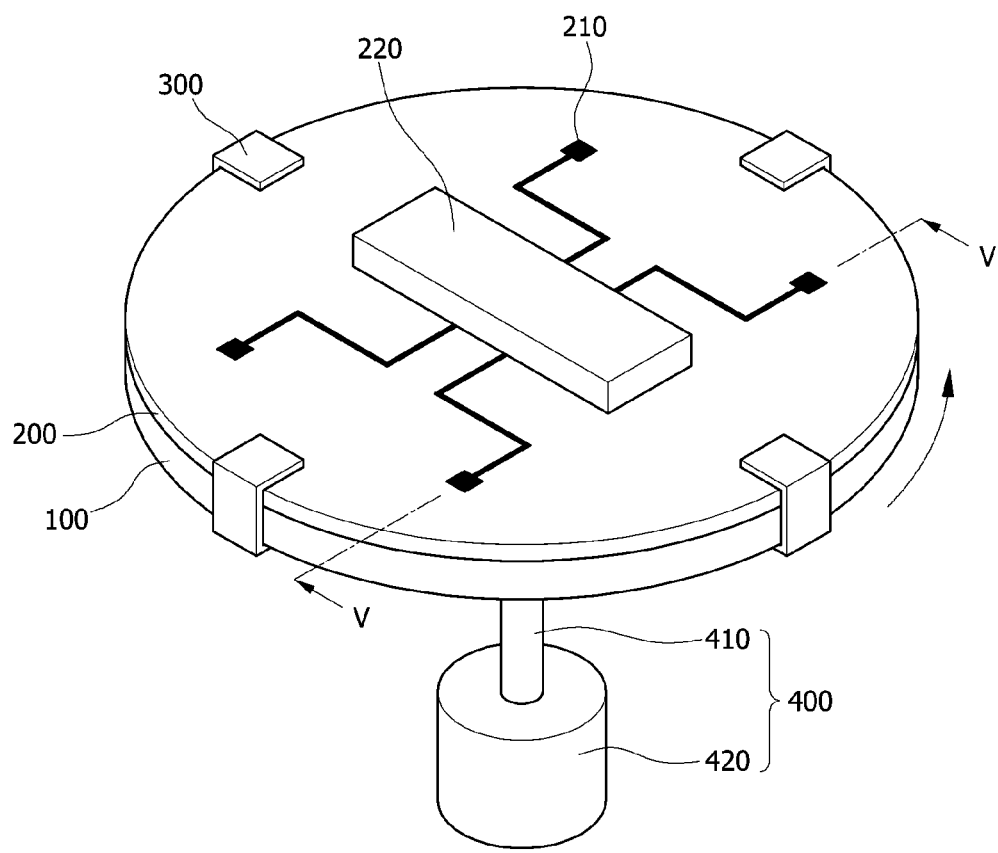
FIGS. 2 and 3 are perspective views illustrating a centrifugal valve control apparatus according to an embodiment of the present disclosure.
Figure 3:
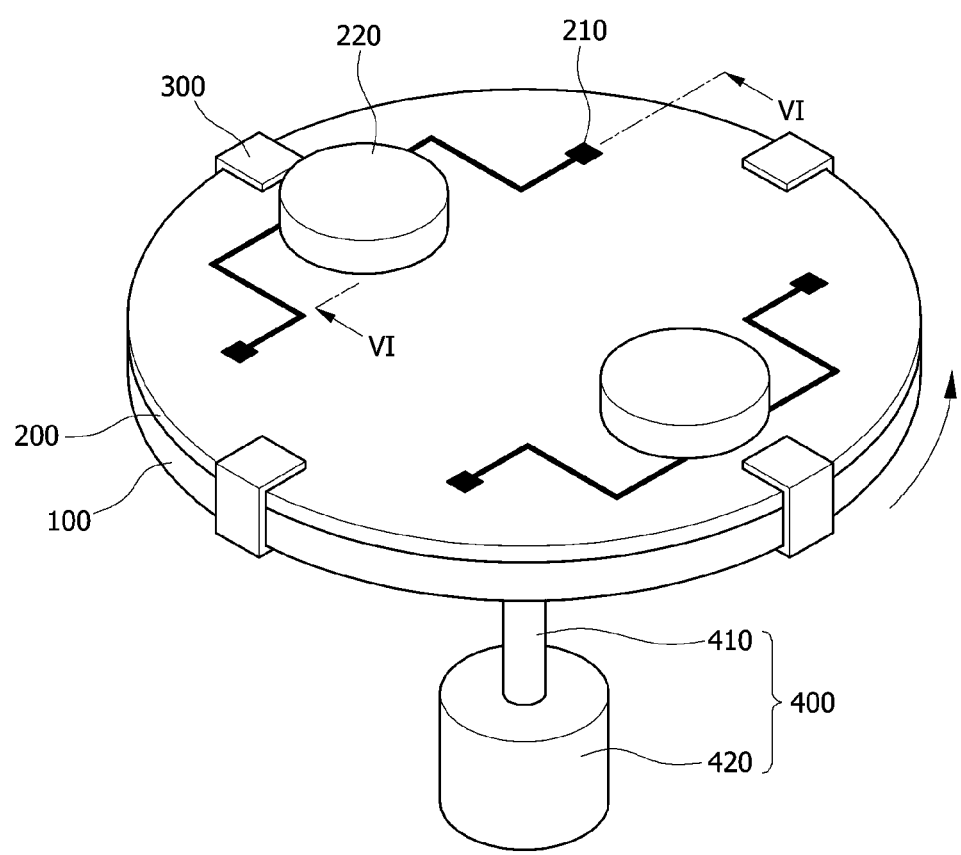
Figure 4:
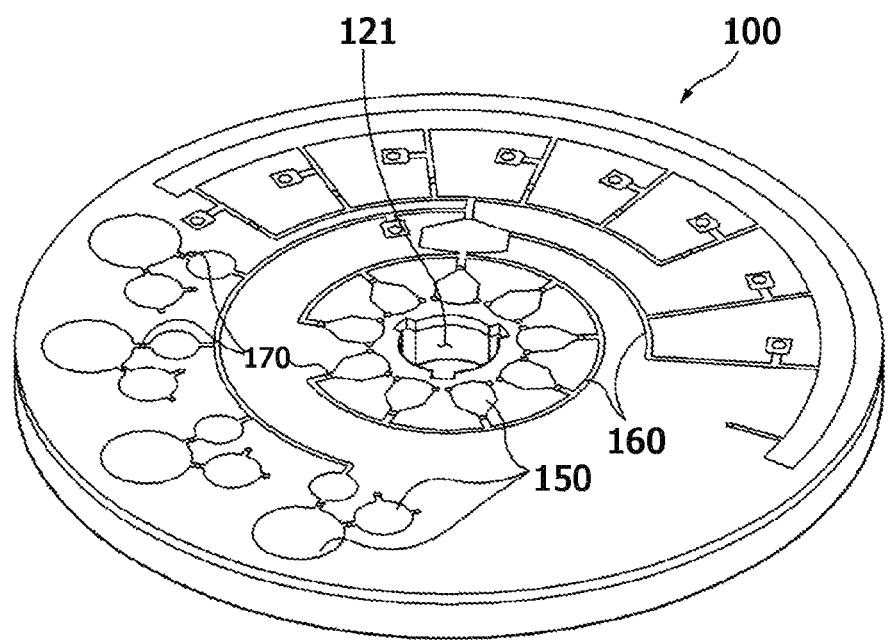
FIG. 4 is a perspective view illustrating a body part of the centrifugal valve control apparatus according to the embodiment of the present disclosure.

FIGS. 2 and 3 are perspective views illustrating a centrifugal valve control apparatus according to an embodiment of the present disclosure, and FIG. 4 is a perspective view illustrating a body part of the centrifugal valve control apparatus according to the embodiment of the present disclosure.

As shown in FIGS. 2 to 4, the centrifugal valve control apparatus according to the embodiment of the present disclosure may include a body part 100, a heating part 200, and a rotation driving part 400.

Here, each of the body part 100 and the heating part 200 may be formed in a rotatable disk shape. For example, the body part 100 may be formed of a tube having a predetermined height, and the heating part 200 may be formed of a substrate, and in this case, the body part 100 may be formed of a cylinder and the heating part 200 may be formed of a circular substrate.

The body part 100 may include a body having a plurality of chambers 150 configured to accommodate fluids and a channel 160 configured to connect at least two chambers 150 among the plurality of chambers 150 to provide a fluid flow path in the body, and a valve 170 configured to open and close the channel 160 to control the flow of the fluids.

Specifically, the body part 100 may be made of an elastomer easy to be molded and having a surface which is biologically inactive, and may also be made of various materials such as a plastic material including polycarbonate (PC) and polystyrene (PS), and the like. However, the present disclosure is not limited thereto, and a material having chemical and biological stability and having good optical transparency and mechanical workability is sufficient.

Further, the body part 100 may be formed of multiple layers of plates, and the chambers 150 and the channels 160 may be formed in the body part 100 by forming engraved structures corresponding to the chambers 150, the channels 160, or the like on surfaces at which the plates come into contact with each other and then joining them.

For example, the body part 100 may be formed of two plates, and, the two plates may be bonded to each other by various methods such as adhesion using adhesives or double-sided adhesive tape, ultrasonic welding, laser welding, and the like.

The valve 170 may include a phase transition material that melts at a high temperature.

Further, the valve 170 may be formed at a point at which the chamber 150 and the channel 160 meet or in the middle of the channel 160, for example, the valve 170 may be formed by injecting a melted phase transition material using a tool such as a dispenser (not shown) into the channel 160 and curing the phase transition material.

Here, the phase transition material may be wax which is melted and then is changed into a liquid state and expanded in volume when heated by a heating member 210, for example, paraffin wax, microcrystalline wax, synthetic wax, natural wax, or the like may be used as the above-described wax.

On the other hand, the phase transition material may be gel, and polyacrylamide, polyacrylates, polymethacrylates, polyvinylamides, or the like may be used as the above-described gel.

On the other hand, the phase transition material may be a thermoplastic resin, and a cyclic olefin copolymer (COC), polymethylmethacrylate (PMMA), polycarbonate (PC), polystyrene (PS), polyoxymethylene (POM), perfluoralkoxy (PFA), polyvinylchloride (PVC), polypropylene (PP), polyethylene terephthalate (PET), polyetheretherketone (PEEK), polyamide (PA), polysulfone (PSU), polyvinylidene fluoride (PVDF), and the like may be used as the above-described thermoplastic resin.

The heating part 200 may include the heating member 210 coupled to the body of the body part 100, and disposed at a position corresponding to the valve 170 provided in the body part 100 and a battery 220 configured to supply power to the heating member 210. Detailed descriptions of the heating part 200 will be provided later.

The rotation driving part 400 rotates the body part 100 and the heating part 200 together with the center of the body part 100 and the heating part 200 as a rotating axis.

Specifically, the rotation driving part 400 may include a rotating shaft 410 coupled to the rotation center of the body part 100 and the heating part 200, a driving motor 420 configured to rotate the rotating shaft 410, and a controller (not shown) configured to control driving of the driving motor 420.

Here, the rotation driving part 400 may be mounted on a center portion of the body part 100 to rotate the centrifugal valve control apparatus at a high speed, and a mounting through hole 121 may be formed in the center portion of the body part 100 so that the rotation driving part 400 may be mounted on the body part 100.

Accordingly, the centrifugal valve control apparatus may pressurize the fluid accommodated in the chamber 150 or the channel 160 in a direction toward an outer circumferential portion of the body part 100 using a centrifugal force generated by the rotation of the rotation driving part 400.

Meanwhile, in the centrifugal valve control apparatus according to the embodiment of the present disclosure, the arrangement of the chambers 150, the channels 160, and the valves 170 may be determined according to particular usage in a biochemical field such as centrifugation of fluid samples, immunity serum reaction, gene analysis, gene extraction, gene amplification, and the like. That is, the centrifugal valve control apparatus according to the embodiment of the present disclosure is not limited to the arrangement type of the chambers 150, the channels 160, and the valves 170 shown in FIG. 4, and may be designed in various forms according to the use thereof.

Figure 5:
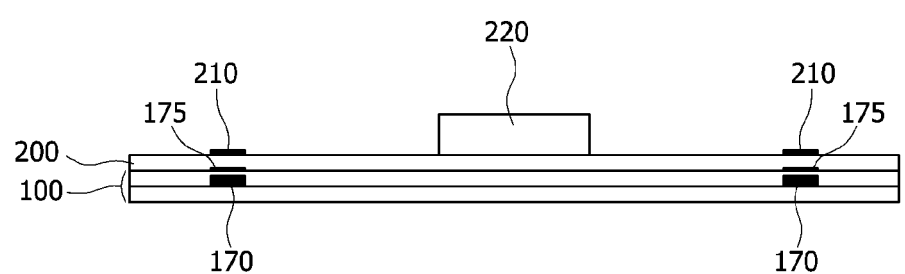
FIG. 5 is a cross-sectional view taken along line V-V in FIG. 2, showing the first embodiment of the present disclosure.
Figure 6:
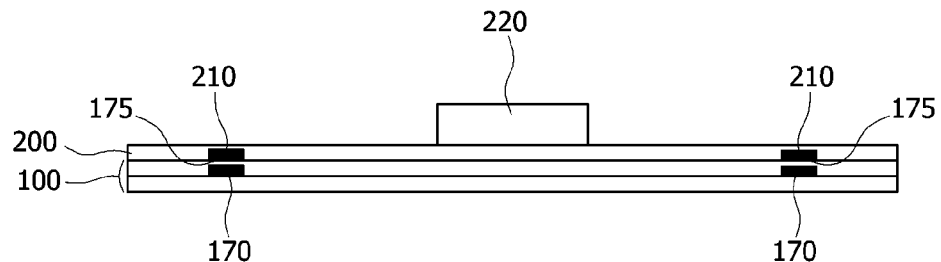
FIG. 6 is a cross-sectional view taken along line V-V in FIG. 2, showing the second embodiment of the present disclosure.
Figure 7:
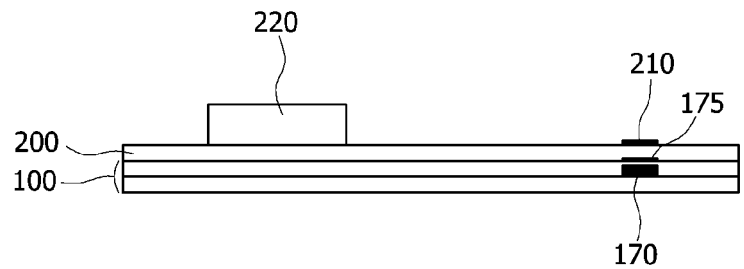
FIG. 7 is a cross-sectional view taken along line VI-VI in FIG. 3, showing the first embodiment of the present disclosure.
Figure 8:
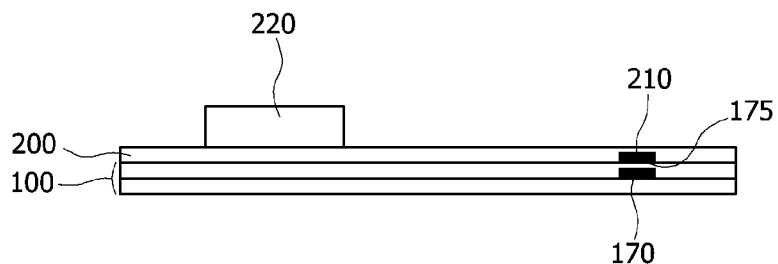
FIG. 8 is a cross-sectional view taken along line VI-VI in FIG. 3, showing the second embodiment of the present disclosure.

FIG. 5 is a cross-sectional view taken along line V-V in FIG. 2, showing the first embodiment of the present disclosure, and FIG. 6 is a cross-sectional view taken along line V-V in FIG. 2, showing the second embodiment of the present disclosure, and FIG. 7 is a cross-sectional view taken along line VI-VI in FIG. 3, showing the first embodiment of the present disclosure, and FIG. 8 is a cross-sectional view taken along line VI-VI in FIG. 3, showing the second embodiment of the present disclosure.

As shown in FIGS. 5 and 7, the heating part 200 of the centrifugal valve control apparatus according to the first embodiment of the present disclosure may include the heating member 210 and the battery 220 thereon.

On the other hand, As shown in FIGS. 6 and 8, the heating part 200 of the centrifugal valve control apparatus according to the second embodiment of the present disclosure may include the heating member 210 provided at a lower part of the heating part 200 and the battery 220 thereon.

Here, the heating member 210 may be disposed at a position corresponding to the valve 170 provided in the body part 100, and may be provided in a number corresponding to the number of the valves 170.

The battery 220 may be configured to raise the heating temperature of the heating member 210 by supplying power to the heating member 210, at least one battery may be provided on the heating part 200, and one battery 220 may supply the power to one or more heating members 210.

Further, the battery 220 may be fixed to or removable from the heating part 200, and may be replaced with a charged battery 220 or charged by receiving external power through a charging terminal (225 in FIG. 8) provided in the heating part 200 in a state of being attached to the heating part 200 when completely discharged.

The heating member 210 receives the power from the battery 220 during rotation of the body part 100 and the heating part 200 and thus the heating temperature of the heating member 210 becomes higher, and the valve 170 provided in the body part 100 is melted by the heating member 210, of which the heating temperature is increased, to open and close the channel 160.

Here, the valve 170 may be configured as a normal open (NO) valve or a normal close (NC) valve according to the operation and configuring manner thereof.

Specifically, in the case in which the valve 170 is configured as a normal open valve, normally, a valve material is accommodated in a cured state in an accommodation space connected to the channel 160 to open the channel 160, and flows out from the accommodation space to the channel 160 to close the channel 160 when the valve material is melted by the heating member 210. Further, in the case in which the valve 170 is configured as a normal close valve, normally, the valve material is formed in a cured state in the middle of the channel 160 to close the channel 160, and the channel 160 is opened when the valve material is melted by the heating member 210.

Meanwhile, the centrifugal valve control apparatus according to the embodiment of the present disclosure may further include a heat transfer member 175 disposed between the valve 170 and the heating member 210.

Here, the heat transfer member 175 may be formed of thermal grease which is a fluid material that transfers heat, and may be formed at a position of the valve 170 on the body part 100 or the heating member 210 under the heating part 200 before attaching the heating part 200 to the body part 100. Further, the heat transfer member 175 may be formed of a material in which at least one of diamond, silver, aluminum oxide, boron nitride, zinc oxide, and aluminum nitride is included in a matrix including at least one of epoxy, silicon, urethane, and acrylate.

As described above, as the heat transfer member 175 is disposed between the heating member 210 and the valve 170, the heat generated by the heating member 210 may be effectively transferred to the valve 170 under the heating member 210 to easily melt the valve material.

As shown in FIG. 2, one battery 220 may be provided on the heating part 200, and in this case, the battery 220 may be disposed at the center of the heating part 200.

Alternatively, a plurality of batteries 220 may be provided on the heating part 200, and may be symmetrically disposed in this case. For example, as shown in FIG. 3, two batteries 220 may be disposed on the heating part 200 and in this case, the two batteries 220 may be symmetrically disposed at lateral sides of the heating part 200, respectively.

Accordingly, the balance of the centrifugal force which acts on the entire surface of the body part 100 while the centrifugal valve control apparatus rotates may be maintained, and a noise caused by bias of the centrifugal force and damage to the centrifugal valve control apparatus may be prevented.

Meanwhile, as shown in FIGS. 2 and 3, the centrifugal valve control apparatus according to the embodiment of the present disclosure may further include a fixing unit 300 configured to fix the heating part 200 to the body part 100.

Here, the fixing unit 300 is configured to fix positions of the valve 170 and the heating member 210 even when the body part 100 and the heating part 200 rotate at a high speed, and allows the heating member 210 to correctly melt the valve material while rotating. That is, the fixing unit 300 allows the heating member 210 to accurately control the valve 170.

Further, the fixing unit 300 is configured to bring the body part 100 into close contact with the heating part 200 so that a gap between the body part 100 and the heating part 200 does not exist, and the heat generated by the heating member 210 may be effectively transferred to the valve 170 under the heating member 210 to effectively melt the valve material.

Further, the fixing unit 300 may include a fixing member configured to couple the heating part 200 and the body part 100.

Here, the fixing member may be provided on at least one of an outer side or center of each of the heating part 200 and the body part 100 so that the heating part 200 may be attached to and detached from the body part 100. Specifically, a plurality of fixing members may be formed at the outer sides of the body part 100 and the heating part 200 to fix the body part 100 and the heating part 200 using methods such as bolt and nut fastening, screw fastening, and the like or a pressure-based fastening method such as a latch or the like. Further, the fixing member may be further formed at the centers of the body part 100 and the heating part 200 to more firmly fix the body part 100 and the heating part 200. The above-described fixing member may include a groove formed in the body part 100 and a protrusion formed on the heating part 200 to be fittable into the groove However, the present disclosure is not limited thereto, and a configuration capable of fixing the body part 100 and the heating part 200 is sufficient.

Meanwhile, in the centrifugal valve control apparatus according to the embodiment of the present disclosure, the heating part 200 may be formed of a flexible element made in the shape of a film of several millimeters or a thin film. In this case, an adhesion layer may be formed on a lower surface of the flexible element, and the heating part 200 may be fixed to the body part through the adhesion layer.

Accordingly, the heating part 200 may be easily fixed to the body part 100 without providing the above-described fixing unit 300, the heating part 200 may be brought into close contact with the body part 100 to be more firmly fixed regardless of the shape of the upper portion of the body part 100 due to the characteristics of the flexible element.

Further, since the flexible element is formed in the shape of the film of several millimeters or the thin film, a separation distance between the heating member 210 and the valve 170 when the heating part 200 and the body part 100 are coupled may be minimized Accordingly, the heat generated by the heating member 210 may be effectively transferred to the valve 170 without providing the above-described heat transfer member 175 between the heating member 210 and the valve 170.

Figure 9:
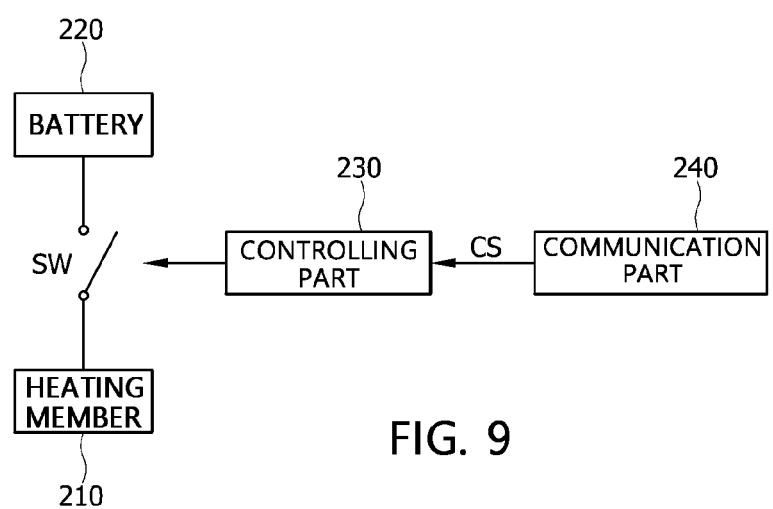
FIG. 9 is a schematic block diagram of the centrifugal valve control apparatus according to the embodiment of the present disclosure.
Figure 10:
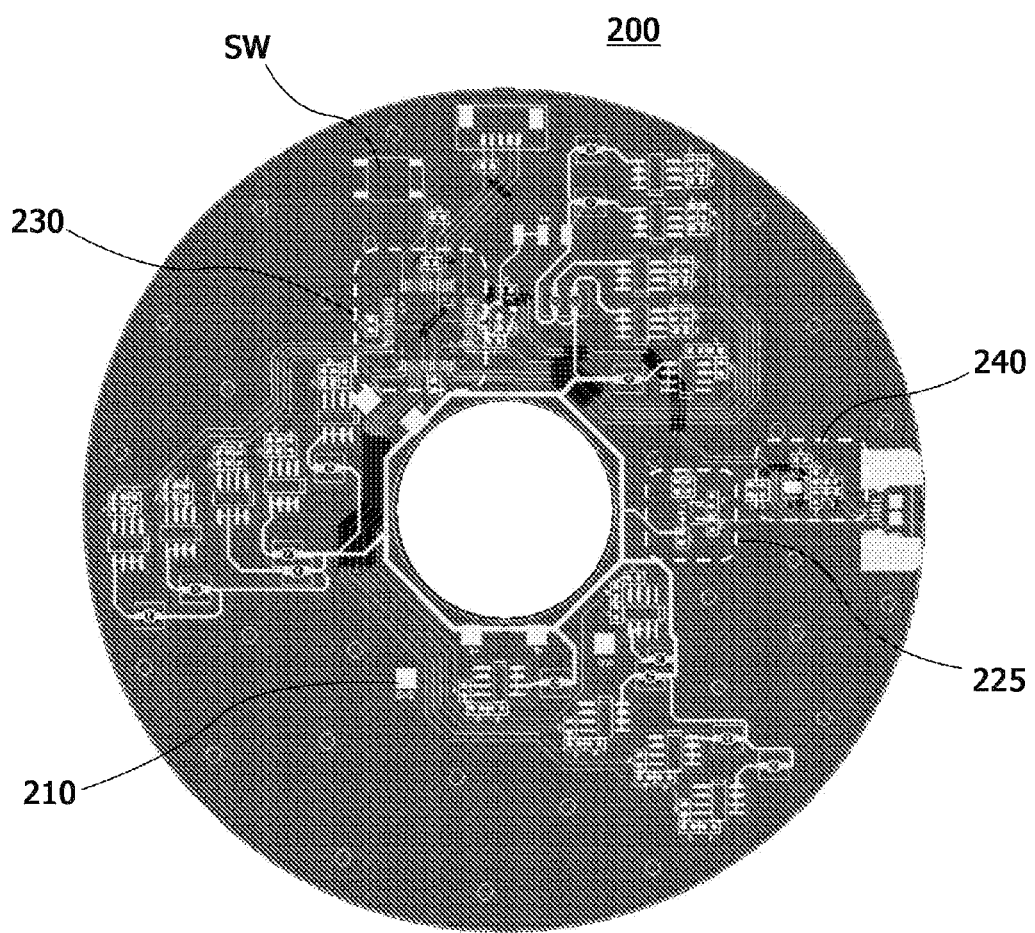
FIG. 10 is a view illustrating a printed circuit board in which configurations shown in FIG. 9 are implemented on a heating part.
Figure 11:
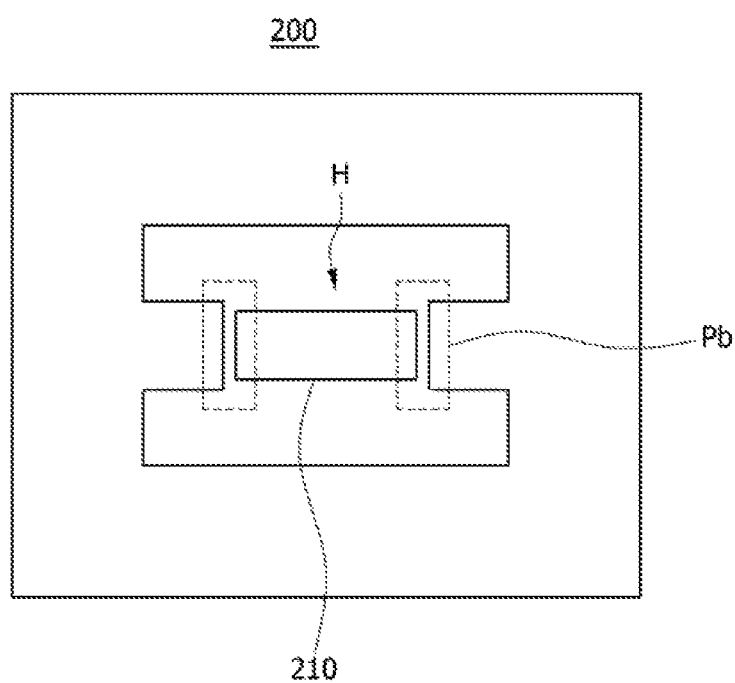
FIG. 11 is a view specifically illustrating a heating member in FIG. 10.

FIG. 9 is a schematic block diagram of the centrifugal valve control apparatus according to the embodiment of the present disclosure, FIG. 10 is a view illustrating a printed circuit board in which configurations shown in FIG. 9 are implemented on a heating part, and FIG. 11 is a view specifically illustrating a heating member in FIG. 10.

As shown in FIGS. 9 to 11, the heating part 200 of the centrifugal valve control apparatus according to the embodiment of the present disclosure may include the heating member 210, the battery 220, a switch SW, a controlling part 230, and a communication part 240.

Here, the heating member 210 may be formed of a chip-shaped heating element and attached to a printed circuit board 200. For example, a resistor 210 which is a heating element may be connected to a circuit pattern on the printed circuit board 200 through soldering. That is, the resistor 210 may be formed so that both ends thereof are coupled in a hole H formed in the heating part 200.

The heating temperature of the above-described heating member 210 may be adjusted according to a current or voltage applied to the heating element. For example, when a current value or voltage value applied to the resistor increases, the heating temperature of the heating member 210 becomes higher, and when the current value or voltage value decreases, the heating temperature of the heating member 210 is lowered.

The switch SW is provided on the printed circuit board 200, and supplies the power charged in the battery 220 to the heating member 210 when the switch SW is turned on, as a configuration for turning on or off electrical connection between the heating member 210 and the battery 220.

Here, the switch SW may be formed of a chip-shaped transistor as a semiconductor element and attached to the printed circuit board 200. For example, the transistor may be connected to the circuit pattern on the printed circuit board 200 through soldering.

Meanwhile, the heating temperature of the heating member 210 required to completely melt the valve material varies according to the type of the valve material. Further, even when the heating member 210 is set to generate heat at the heating temperature required to completely melt the valve material, as the heating part 200 rotates, the heating temperature of the heating member 210 is lowered and thus the valve material may not be completely melted. In addition, since the amount of change in the heating temperature varies according to a rotational speed of the heating part 200, the above-described variables should be considered to accurately control the valve 170.

For this end, the controlling part 230 controls a current value or voltage value applied to the heating element according to the type of the material forming the valve 170 or a rotational speed of each of the body part 100 and the heating part 200.

Specifically, the controlling part 230 may control the current value or voltage value applied to the heating element to be higher when a melting point of the valve material is higher, and may control the current value or voltage value applied to the heating element to be smaller when the melting point of the valve material is lower.

Further, the controlling part 230 may preset and store the amount of change in the heating temperature which varies according to the rotational speed of the heating part 200, and then may control the current value or voltage value applied to the heating element according to the rotational speed of the heating part 200 and the amount of change in the heating temperature. For example, the current value or voltage value applied to the heating element may be controlled to be greater when the rotational speed of the heating part 200 is higher, and may be controlled to be smaller when the rotational speed of the heating part 200 is lower.

Accordingly, in the centrifugal valve control apparatus according to the embodiment of the present disclosure, since the heating member 210 may completely melt the valve material, the valve 170 may be accurately controlled.

The controlling part 230 may control turning on or off of the switch SW. That is, the controlling part 230 may turn on the switch SW at a preset timing to supply the power charged in the battery 220 to the heating member 210, and may preset a melting time in which the heating member 210 may completely melt the valve material and turn off the switch SW after the melting time passes to disconnect the power supplied to the heating member 210.

Meanwhile, the melting time required to completely melt the valve material varies according to the type of the valve material. Further, even when the heating member 210 is set to generate heat at the melting time required to completely melt the valve material, as the heating part 200 rotates, the heating temperature of the heating member 210 is lowered and thus the valve material may not be completely melted during the melting time. In addition, since the amount of change in the heating temperature varies according to the rotational speed of the heating part 200, the above-described variables should be considered to accurately control the valve 170.

For this end, the controlling part 230 controls the turning on or off of the switch SW according to the type of the material forming the valve 170 or the rotational speed of each of the body part 100 and the heating part 200.

Specifically, the controlling part 230 may control the melting time until the switch SW is turned off after being turned on to be greater when the melting point of the valve material is higher, and may control the melting time to be smaller when the melting point of the valve material is lower.

Further, the controlling part 230 may preset and store the amount of change in the heating temperature which varies according to the rotational speed of the heating part 200, and then may control the melting time until the switch SW is turned off after being turned on according to the rotational speed of the heating part 200 and the amount of change in the heating temperature. For example, the melting time may be controlled to be greater when the rotational speed of the heating part 200 is higher, and may be controlled to be smaller when the rotational speed of the heating part 200 is slower.

Accordingly, in the centrifugal valve control apparatus according to the embodiment of the present disclosure, since the heating member 210 may completely melt the valve material, the valve 170 may be accurately controlled.

The controlling part 230 may be provided in the heating part 200 or at the outside. That is, the controlling part 230 may be formed in a chip shape and attached to the printed circuit board 200 to directly control the heating member 210 or the switch SW, or may be provided in an external system to remotely control the heating member 210 or the switch SW through communication.

The communication part 240 is provided in the heating part 200 and communicates with the outside to apply a control signal to the controlling part 230.

Here, the communication part 240 receives a control signal CS through communication with the outside and then applies the control signal CS to the controlling part 230 so that the heating member 210 or the switch SW may be controlled.

In the above-described centrifugal valve control apparatus according to the embodiment of the present disclosure, since the heating member 210 is provided at the position corresponding to the valve 170 and the position of the heating member 210 is fixed even while the centrifugal valve control apparatus rotates, the heating member 210 may melt the valve material at a correct position and thus the valve 170 may be accurately controlled.

Further, in the centrifugal valve control apparatus according to the embodiment of the present disclosure, since the switch SW and the heating member 210 are controlled in consideration of the type of the valve material and a rotational speed of the centrifugal valve control apparatus, the heating member 210 may completely melt the valve material and thus the valve 170 may be accurately controlled.

In addition, in the centrifugal valve control apparatus according to the embodiment of the present disclosure, since the battery 220 and other components which may be disposed on the heating part 200 are symmetrically disposed, the balance of the centrifugal force which acts on the entire surface of the body part 100 may be maintained while the centrifugal valve control apparatus rotates, and the noise caused by bias of the centrifugal force and the damage to the centrifugal valve control apparatus may be prevented.

In addition, in the centrifugal valve control apparatus according to the embodiment of the present disclosure, since the heat transfer member 175 is disposed between the heating member 210 and the valve 170, the heat generated by the heating member 210 may be effectively transferred to the valve 170 under the heating member 210 to easily melt the valve material.

According to the present disclosure, since a heating member is provided at a position corresponding to a valve and the position of the heating member is fixed even while a centrifugal valve control apparatus rotates, the heating member can melt a valve material at a correct position and thus the valve can be accurately controlled.

Further, according to the present disclosure, since a switch and a heating member are controlled in consideration of the type of a valve material and a rotational speed of the centrifugal valve control apparatus, the heating member can completely melt the valve material and thus the valve can be accurately controlled.

In addition, according to the present disclosure, since a battery and other components which can be disposed on a heating part are symmetrically disposed, the balance of a centrifugal force which acts on the entire surface of a body part can be maintained while the centrifugal valve control apparatus rotates, and a noise caused by bias of the centrifugal force and damage to the centrifugal valve control apparatus can be prevented.

In addition, according to the present disclosure, since a heat transfer member is disposed between a valve and a heating member, heat generated by the heating member can be effectively transferred to the valve under the heating member to easily melt a valve material.

Effects of the present disclosure are not limited to the above-described effects and unmentioned effects may be apparently understood by those skilled in the art from following disclosures.

In the specification, the described embodiments and the accompanying drawings are only provided to exemplarily describe some of the technical spirit within the present disclosure. Accordingly, since the embodiments disclosed in the specification is not for limiting the technical spirit of the present disclosure but for describing the technical spirit of the present disclosure, it is apparent that the scope of the technical spirit of the present disclosure is not limited by the embodiments. Modifications and specific embodiments in the scope of the technical spirit within the specification and the drawings of the present disclosure which may be easily inferred by those skilled in the art should be interpreted to be within the scope of the present disclosure.

What is claimed is:
1. A centrifugal valve control apparatus comprising:
a body part including a body having a chamber and a channel connected to the chamber, and a valve configured to open and close the channel;
a heating part coupled to the body, and including a heating member disposed at a position corresponding to the valve;
a rotation driving part configured to rotate the body part and the heating part together; and
a battery configured to supply power to the heating member,
wherein the valve is formed to open and close the channel by the heating member while the body part and the heating part rotate together, and
wherein a plurality of batteries are provided on the heating part and symmetrically disposed.

2. The centrifugal valve control apparatus of claim 1, wherein:
the body is formed of a tube having a predetermined height; and
the heating part is formed of a substrate.

3. The centrifugal valve control apparatus of claim 1, wherein:
each of the chamber and the channel is provided in the body.

4. The centrifugal valve control apparatus of claim 1, wherein:
the valve is provided in the body; and
the heating member is provided at a lower part of the heating part.

5. The centrifugal valve control apparatus of claim 1, wherein:
a plurality of channels are provided in the body, and a plurality of valves are formed in the channels, respectively.

6. The centrifugal valve control apparatus of claim 1, wherein the battery is formed to supply the power to one or more heating members provided in the heating part.

7. The centrifugal valve control apparatus of claim 1, wherein the battery is disposed at a center of the heating part.

8. The centrifugal valve control apparatus of claim 1, wherein the rotation driving part includes a rotating shaft coupled to a rotation center of each of the body and the heating part;
a driving motor configured to rotate the rotating shaft; and
a controller configured to control driving of the driving motor.

9. The centrifugal valve control apparatus of claim 1, further comprising a heat transfer member provided between the valve and the heating member.

10. The centrifugal valve control apparatus of claim 9, wherein the heat transfer member is formed of a material in which at least one of diamond, silver, aluminum oxide, boron nitride, zinc oxide, and aluminum nitride is included in a matrix including at least one of epoxy, silicon, urethane, and acrylate.

11. The centrifugal valve control apparatus of claim 1, wherein the valve is formed of a phase transition material melted by heating of the heating member.

12. The centrifugal valve control apparatus of claim 1, further comprising a switch configured to turn on or off electrical connection between the heating member and the battery.

13. The centrifugal valve control apparatus of claim 1, further comprising a fixing unit configured to fix the heating part to the body part.

14. The centrifugal valve control apparatus of claim 13, wherein the fixing unit includes a fixing member provided on at least one of an outer side or a center of each of the body part and the heating part.

15. The centrifugal valve control apparatus of claim 13, wherein the fixing unit includes a groove formed in the body part and a protrusion formed on the heating part to be fittable into the groove.

16. The centrifugal valve control apparatus of claim 1, wherein the heating part is formed of a film-shaped or thin film-shaped flexible element.

17. The centrifugal valve control apparatus of claim 16, wherein:
- an adhesion layer is formed on a lower surface of the flexible element; and
- the heating part is fixed to the body part through the adhesion layer.

18. A centrifugal valve control apparatus comprising:
- a body part including a body having a chamber and a channel connected to the chamber, and a valve configured to open and close the channel;
- a heating part coupled to the body, and including a heating member disposed at a position corresponding to the valve; and
- a rotation driving part configured to rotate the body part and the heating part together, wherein the valve is formed to open and close the channel by the heating member while the body part and the heating part rotate together, wherein the heating member is formed of a heating element, and the heating element is provided in a hole formed in a lower part of the heating part.

19. The centrifugal valve control apparatus of claim 18, wherein the heating element is formed of a resistor, and further comprises a controlling part configured to control a current or voltage applied to the resistor.

20. The centrifugal valve control apparatus of claim 19, wherein the controlling part controls the current or voltage applied to the resistor according to the type of a material forming the valve or a rotational speed of each of the body part and the heating part.

21. The centrifugal valve control apparatus of claim 19, further comprising a communication part provided on the heating part and configured to communicate with an outside of the communication part to apply a control signal to the controlling part.

\* \* \* \* \*